Jan. 17, 1950
C. H. GAMBELL
2,494,752
PRESSURE FLUID CONTROL ARRANGEMENT
Filed Aug. 10, 1943
2 Sheets-Sheet 1
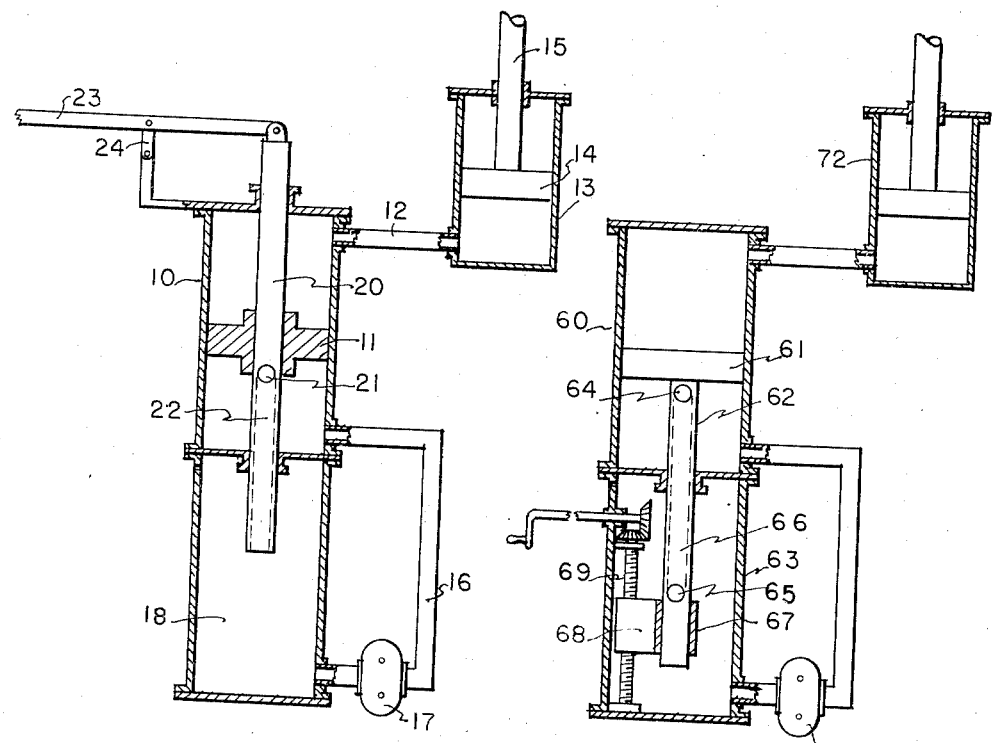
FIG. 1
FIG. 4
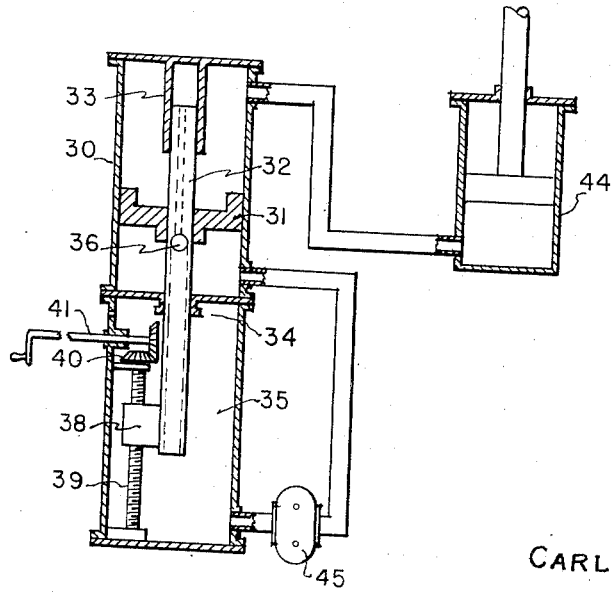
FIG. 2
CARLOS H. GAMBELL
INVENTOR
BY *E. A. V Buckhorn*
ATTORNEY

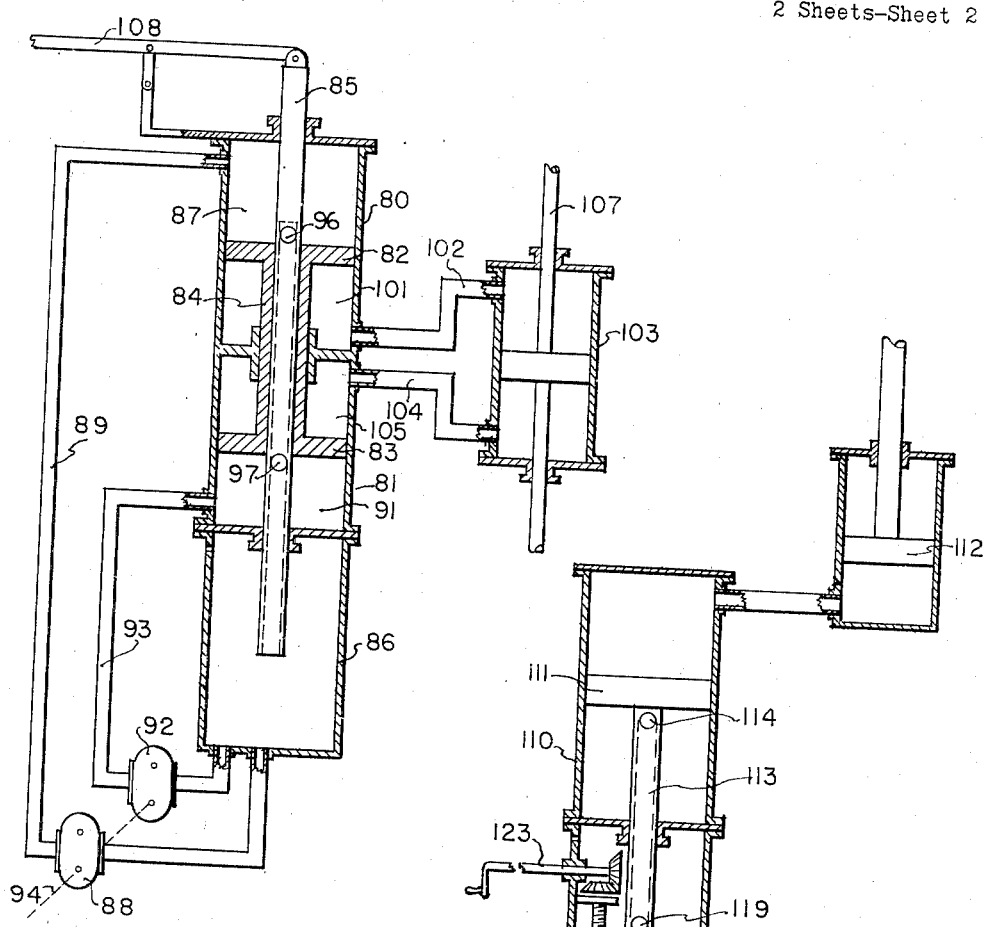
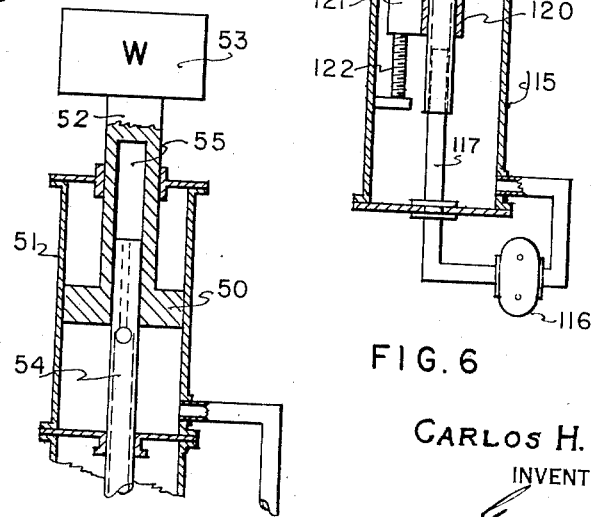
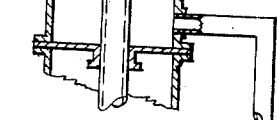

Patented Jan. 17, 1950

2,494,752

UNITED STATES PATENT OFFICE 2,494,752

PRESSURE FLUID CONTROL ARRANGEMENT

Carlos H. Gambell, Mulino, Oreg.

Application August 10, 1943, Serial No. 498,064

2 Claims. (Cl. 60—54.5)

The present invention relates to pressure fluid control arrangements and, more particularly, to arrangements for controlling pressure fluid for power actuating devices such as servomotors, rams, presses and the like.

Frequently it is desirable to provide a pressure fluid operated motor device, the pressure fluid being supplied by a continuously driven positive displacement pump means which may or may not be driven at a constant speed. In the normal control arrangement for such a pressure fluid system a pressure relief valve is generally provided on the discharge side of the pump for by-passing fluid during such times as full pressure is not required for operating the motor device. There are numerous disadvantages of such an arrangement, one of which is that the pressure relief valve limits the maximum pressure which is available at any time for operating the motor device to a value less than the maximum pressure of which the pump may be capable of developing. Another disadvantage is that if the relief valve is adjusted for a relatively high operating pressure, then the pump is required to be continuously operated against such a high back pressure irrespective of the requirements for the motor. Consequently, the wear on the pump and the driving connection therefor is excessive. Furthermore, with such a system the operating fluid tends to become overheated and aerated under the maintenance of high pressure.

It is an object of the present invention, therefore, to provide a new and improved arrangement for controlling pressure fluid from a continuously driven pump connected to servomotors and the like devices.

A further object of the present invention is to provide a new and improved control arrangement including a valve means which is both manually and automatically operable for adjusting the back pressure to the pump in accordance with the load requirements of the motor device connected thereto.

In accordance with one form of the invention the control arrangement comprises a cylinder having a piston arranged therein operatively connected to a load device normally urging the piston in one direction. A source of pressure fluid from a continuously driven pump is connected to the cylinder so that it normally urges the piston in opposition to the load impressed thereupon. A stem extends axially through the cylinder and piston and is longitudinally movable such as by a manual control lever connected thereto. A pressure fluid discharge port is provided in the stem within the cylinder and within the chamber thereof which is connected to the source of pressure fluid and a fluid passage communicating with the port extends through the stem to one end thereof beyond the end wall of the cylinder. Fluid discharge from the cylinder through the stem is received in a sump chamber which in turn is connected to the pump. By adjustment of the relative position of the stem within the cylinder, the position of the floating piston is correspondingly controlled and hence also the degree of actuation of the load device connected thereto.

Further objects and advantages, together with additional modifications, of the invention will be disclosed in the following specification and in the accompanying drawing while the features of novelty will be pointed out with greater particularity in the appended claims.

In the drawings Fig. 1 is a view partly in section illustrating the invention according to one form thereof; Figs. 2, 3, 4, 5 and 6 are additional views illustrating further modifications of the invention.

In the following description the invention in its various modifications will be described as it may be adapted for controlling the operation of a servomotor. It will become obvious, however, as the description proceeds that the invention is not to be necessarily so limited in that it may equally well be used in other specific applications. Also, while reference is made to oil as the pressure fluid, it is to be understood that any other suitable liquid or gaseous fluid may be used instead.

Referring to Fig. 1, the control arrangement comprises a cylinder 10 having a piston 11 cooperatively arranged therein. The chamber in the upper end of the cylinder communicates by connection 12 with the servomotor 13 having a piston 14 arranged therein for actuating the piston rod 15. The lower chamber of the cylinder 19 is connected by pipe 16 to the discharge side of the pump 17 which is adapted to receive fluid from the sump chamber 18, the sump chamber being shown in this instance as being directly connected to the lower end of the cylinder 10. An axial stem 20 is slidably arranged through the cylinder 10 and the piston 11, suitable bushings being provided about the stem in the opposite end walls of the cylinder. A discharge port 21 is provided in the stem 20 which communicates with a longitudinal passage 22 extending through the lowermost end of the stem projecting into the interior of the sump chamber 18. The stem 20 is adapted to be longitudinally adjusted within the cylinder 10 by suitable control means connected thereto represented by the manual control lever 23 pivotally mounted as at 24 onto the upper end of the cylinder 10 and pivotally attached to the outer end of the stem 20.

The pump 17 is continuously driven by a suitable means (not shown) so that pressure fluid is continuously supplied to cylinder 10. The discharge of fluid through the port 21 of the stem 20 is controlled by the floating piston 11 so as to maintain a balanced condition of pressure in the upper and lower chambers of the cylinder 10 for any predetermined position of adjustment of the stem 20. This condition of balanced pressure is maintained substantially irrespective of the load impressed upon the piston of the servomotor 13. The apparatus is shown in an intermediate condition of adjustment in which the piston rod 15 of the servomotor 13 is maintained in a partially extended condition.

Now assume that the load on the piston rod 15 is substantially increased tending to drive the piston 14 downwardly which, in turn, tends to cause a displacement of fluid from the motor cylinder into the upper chamber of cyinder 10 to urge the floating piston 11 downwardly against the pressure existing in the lower chamber. Such movement of the piston on the stem 20 will cause a partial closing of the port 21 resulting in an increased throttling of the fluid discharging into the escape passage 22. This results in an increase of pressure within the lower chamber of cylinder 10 and upward readjustment of the piston 11 until a condition of balanced pressure is again reestablished between the upper and lower chambers of the cylinder 10. It will be obvious, therefore, that the predetermined position of the piston 14 of the servomotor 13 is maintained irrespective of the load impressed thereupon while the back pressure to the pump 17 will never at any time be greater than that required to maintain a balanced condition of pressure between the two chambers of the cylinder 10. In a condition of light load on the servomotor 13 the back pressure upon the pump 17 will be correspondingly lightened due to less throttling occurring at the port 21.

By sliding the stem 20 either up or down within the cylinder 10 and which may be accomplished with relatively slight effort upon the lever 23 the position of the floating piston 11 within the cylinder 10 may be predetermined and, hence, also the extent of operation of the servomotor 13.

Referring to the modification of Fig. 2, the arrangement there shown comprises a cylinder 30 having a floating piston 31 arranged therein and an axially extending control stem 32. The upper end of the control stem 32 is guided within a tubular extension 33 secured to the adjacent end wall of the cylinder while the opposite end of the stem extends through a bushing 34 into the sump chamber 35. The stem 32, as in the previously described modification, is provided with a discharge port 36 and a longitudinal passage 37 establishing communication between the port 36 and the sump chamber 35. The passage 37 extends upwardly so as to drain the space within the tubular guide 33 above the upper end of the stem 32. The upper end of the stem fits closely enough within the guide 33 so as to prevent appreciable leakage of fluid from the chamber above the piston 31 therepast. Secured to the lowermost end of the stem 32 is a nut 38 which is cooperatively threaded upon a screw 39 suitably journalled at its opposite ends to the sump casing. A gear 40 is provided upon the upper end of the screw 39 and which is cooperatively meshed by a second gear provided on the end of the shaft 41 extending into the sump chamber and suitably journalled in the wall thereof. Rotation of the shaft 41 may be effected by any suitable means such as a hand crank, as indicated, for turning the screw 39 to raise or lower the nut 38 and the stem 32.

The chamber above the piston 31 is arranged in communication with a servomotor device 44 while pressure fluid is supplied to the lower chamber of the cylinder 30 by means of the pump 45. The cooperation between the piston 31 and the ported stem 32 in regulating the balance of pressure on the opposite sides of the piston 31 for any predetermined adjustment of the stem 32 will be the same as described in connection with the preceding modification.

In the previously described modifications the load is operated upon by a servomotor or like device, which in turn transmits the load upon the floating piston within the controller cylinder through the medium of the fluid connection therebetween. It will be obvious that the separate servomotor device is not essential in that the load may be directly, or mechanically, impressed upon the floating piston in a manner similar to that indicated in the partial view of Fig. 3.

Referring to Fig. 3, it will be observed that the piston 50 arranged within the cylinder 51 is provided with a rod 52 extending through the upper end wall of the cylinder 51 and which may be directly connected to the load indicated by the weight 53. The upper end of the control stem 54 extends into the axial bore 55 provided through the piston 50 and a suitable distance up into the rod 52. The remainder of the arrangement may be similar to that of Fig. 2 while the mode of operation will also be substantially the same.

In all of the previously described modifications control regulation is effected by the cooperation between the piston and the manually adjustable stem which is slidably arranged therethrough. It will be obvious to those skilled in the art that this particular arrangement is not necessary for arriving at the desired result. It will be observed that the cooperating piston and ported stem, in effect, amount to a two part compensating valve in which one valve part is manually adjustable for predetermining the extent of operation of the piston and load connected thereto, while the other part is automatically controlled in accordance with the actual position of the piston within the cylinder. The modification of Fig. 4 represents a rearrangement of such valve parts but embodying the same principle of operation.

In Fig. 4 a cylinder 60 is provided with a piston 61 slidably arranged therein which is fast coupled to the stem 62, the lower end of which, in this instance, extends through the lower end wall of the cylinder into the sump chamber 63. The stem 62 is provided with an upper port 64 adjacent the piston 61 and a lower port 65 in that portion extending within the sump chamber 63 and a longitudinal passage 66 communicating therebetween. The manually controlled valve part in this instance comprises a cylindrical sleeve 67 which is telescopically arranged over the lower end of the stem 62. The sleeve 67 may be arranged for manual adjustment by any suitable means such as the nut and screw arrangement 68, 69 similar to that of Fig. 2. Fluid is adapted to be supplied from the sump chamber 63 to cylinder 60 beneath the piston 61 by the pump 71 while the chamber above the piston 61 is connected in communication with the servomotor device 72. In this instance the stem 62 is actuated by the piston 61 while the discharge of pressure fluid from the chamber beneath the piston is controlled by the sleeve valve member 67 arranged about the stem which regulates the throttling at the port 65. The principle of operation of this device is substantially the same as in the previously described modifications.

The principle of the present invention may be applied equally well in the control of a double acting fluid system. For example, in Fig. 5 is illustrated an adaptation of the control arrangement of Fig. 1 for controlling a double acting servomotor. In this modification a double cylinder 80, 81 is shown having pistons 82, 83 floatingly arranged in each respectively. As shown, the pistons 82 and 83 are connected together by a cylindrical sleeve 84 though it will be understood that such interconnection is not essential. A manually adjustable stem 85 is arranged axially through the double cylinder 80, 81 and also through the pistons 82, 83 and the connecting sleeve 84. Pressure fluid is adapted to be supplied from the sump chamber 86 to the upper cylinder chamber 87 by means of a fluid pump 88 through connection 89 and to the lower cylinder chamber 91 through pump 92 and connection 93. The pumps 88 and 92 are preferably of substantially identical capacity and type and coupled together for driving in unison as indicated by the dotted line 94. The escape of pressure fluid from the upper chamber 87 is effected through port 96 provided in stem 85 and which is regulated by the piston 82 while escape of pressure fluid from the lower chamber 91 is effected through port 97 and which, in turn, is regulated by piston 83. The ports 96 and 97 are suitably spaced as regards the spacing between the pistons 82 and 83 so that proper throttling of each is effected in the balanced condition of pressure between the cylinder chambers 87 and 91. The chamber 101 of the upper cylinder is connected by conduit 102 to the upper chamber of the servomotor 103 while the lower chamber thereof may be connected by conduit 104 to the chamber 105 of the lower cylinder 81.

In the operation of the last described modification assume, for example, that it is desired to effect elevation of the stem 107 of the servomotor 103. To do this the stem 85 is lifted, such as by the hand lever 108, which will close the port 97 thereby causing an increase of fluid pressure within the chamber 91 tending to force the piston 83 upwardly which, in turn, will cause a transfer of fluid from the chamber 105 into the lower chamber of the servomotor, the fluid from the upper chamber of the servomotor being forced into the expanding chamber 101 of the upper cylinder 80. When a balanced condition of pressure obtains within the chambers 91 and 87 by a partial uncovering of the port 97, motion of the pistons 82, 83 will cease with a stoppage of the stem 107 of the servomotor in the desired position. Conversely, lowering of the servomotor piston will be effected by manual adjustment of the stem 85 to the desired lower position.

It will be readily appreciated that the fluid pressure within the control cylinder may be regulated with the valve means of the present invention arranged between the source of pressure fluid and the cylinder instead of on the discharge side of the control cylinder as thus far described. Referring to the embodiment of Fig. 6, 110 is a control cylinder having a piston 111 arranged therein, the fluid filled chamber above piston 111 being connected to a servomotor 112 as previously described. Connected to the piston 111 is a hollow stem 113 having a port 114 communicating with the chamber in cylinder 110 beneath the piston. Pressure fluid is supplied from the sump chamber 115 by pump 116 through the tube 117 extending telescopically within the lower end of the stem 113. A bypass port 119 is provided in the stem 113, the flow of fluid therethrough being controlled by the valve sleeve 120, the position of which is manually adjustable by means of the follower nut 121 arranged upon the screw 122 and which in turn is operable through suitable gearing and shaft 123. By raising or lowering the sleeve 120, the fluid pressure obtaining within the cylinder 110 can be controlled to regulate the relative position of the piston 111 and hence also the position of the servomotor.

Having described the invention in what are considered to be typical embodiments thereof, it is desired that it be understood that details shown are merely illustrative and that the invention may be carried out in other ways.

I claim:

1. In a pressure fluid control arrangement, a cylinder including a pair of opposite end walls and an intermediate wall dividing the cylinder into a pair of chambers, a piston in each of said chambers connected by an axial cylindrical section extending through said intermediate wall, an inlet for pressure fluid adjacent each of said opposite end walls, a manually adjustable stem arranged axially through said cylinder and through said cylindrical section interconnecting said pistons, a pair of discharge ports in said stem, the distance between said ports being slightly greater than the distance between the opposite ends of said pistons, a passage through said stem interconnecting said discharge ports for conveying pressure fluid therefrom to a point outside of said cylinder, a servomotor having a piston therein defining chambers on the opposite sides thereof, and a pressure fluid connection between each of said servo-motor chambers and a corresponding chamber portion between one of said pistons in said cylinder and said intermediate wall.

2. In a pressure fluid control arrangement, a cylinder having a transverse wall intermediate the opposite ends thereof dividing said cylinder into a pair of chambers, a piston in each of said chambers, an axial cylindrical member extending through said transverse wall and interconnecting said pistons, a longitudinally slidable stem arranged axially through said cylinder and said cylindrical member, an inlet for pressure fluid in each of the opposite end portions of said pair of chambers, a pair of discharge ports in said stem, said discharge ports being spaced apart a distance slightly greater than the opposite ends of said pistons, a discharge passage extending longitudinally through said stem interconnecting said discharge ports for conveying pressure fluid to a point outside of said cylinder, means for manually adjusting the relative longitudinal position of said stem, a servo-motor including a piston defining a pair of chambers on the opposite sides thereof, pressure fluid conduit means interconnecting each of said servo-motor chambers with a corresponding chamber portion adjacent each of the opposite sides of said transverse wall in said cylinder.

CARLOS H. GAMBELL.

REFERENCES CITED

The following references are of record in the file of this patent:

UNITED STATES PATENTS

| Number | Name | Date |
|---|---|---|
| 773,365 | Atkins | Oct. 25, 1904 |
| 1,604,545 | Bragg | Oct. 26, 1926 |
| 1,846,089 | Davis | Feb. 23, 1932 |
| 1,960,996 | Guernsey | May 29, 1934 |
| 1,967,893 | Libbey | July 24, 1934 |
| 2,136,318 | Rossmann | Nov. 8, 1938 |
| 2,375,204 | Baker | May 8, 1945 |

FOREIGN PATENTS

| Number | Country | Date |
|---|---|---|
| 802,776 | France | of 1936 |
| 801,222 | France | of 1936 |
| 4,186 | Great Britain | of 1878 |